United States Patent [19]

Sakamoto

[11] Patent Number: 5,045,931
[45] Date of Patent: Sep. 3, 1991

[54] METHOD OF AND APPARATUS FOR RECORDING HALFTONE IMAGES AND HALFTONE IMAGES PRODUCED THEREBY

[75] Inventor: Takashi Sakamoto, Kyoto, Japan

[73] Assignee: Dainippon Screen Mfg. Co., Ltd., Kyoto, Japan

[21] Appl. No.: 432,425

[22] Filed: Nov. 6, 1989

[30] Foreign Application Priority Data

Nov. 15, 1988 [JP] Japan .................. 63-288075

[51] Int. Cl.$^5$ .............................................. H04N 1/23
[52] U.S. Cl. .................................. 358/75; 358/80; 358/454; 358/456
[58] Field of Search .............. 358/75, 454, 456, 459, 358/298, 467, 458

[56] References Cited

U.S. PATENT DOCUMENTS

| | | | |
|---|---|---|---|
| 3,911,480 | 10/1975 | Brucker | 358/75 |
| 3,983,319 | 9/1976 | Moe et al. | 358/298 X |
| 4,115,816 | 9/1978 | Moe et al. | 358/75 X |
| 4,149,183 | 4/1979 | Pellar et al. | 358/75 |
| 4,189,752 | 2/1980 | Moe et al. | 358/298 |
| 4,673,971 | 6/1987 | Ikuta et al. | 358/75 |
| 4,773,734 | 9/1988 | Inoda | 358/298 X |

FOREIGN PATENT DOCUMENTS 52-49361 12/1977 Japan .
55-6393 1/1980 Japan .
58-93057 6/1983 Japan .

*Primary Examiner*—Kenneth A. Wieder
*Assistant Examiner*—Glenn W. Brown
*Attorney, Agent, or Firm*—Lowe, Price, LeBlanc and Becker

[57] ABSTRACT

A printed image without rosette moire can be produced by adjusting positional relations among halftone images. Halftone dots ($M_1$, $C_1$) of magenta and cyan printers are placed at a reference position ($P_1$). A halftone dot ($K_1$) of black printer is placed at a position ($PK_1$) which is half a screen pitch ($d_1$) distant from the reference position ($P_1$) in one of a first direction representing the screen angle (45°) of the halftone image for the black printer and a second direction inclined at 90° away from said first direction. Screen angles of respective halftone images are set so that each of differences between screen angle (15°, 45°) of the cyan and black printers and between screen angles (75°, 45°) of the magenta and black printers is about 30°.

22 Claims, 14 Drawing Sheets

RC₁  RC₂  K₁(45°)  M₁(75°)
P₁        C₁(15°)

RC₃  P₂  RC₄  M₂(θ₃)  K₂(θ₂)
C₂(θ₁)

RC6    P2    RC6    VA2

METHOD OF AND APPARATUS FOR RECORDING HALFTONE IMAGES AND HALFTONE IMAGES PRODUCED THEREBY

BACKGROUND OF THE INVENTION

1. Field of the Invention

The present invention relates to a method of and an apparatus for recording halftone images to be employed in reproducing a color image, and more particularly, it relates to a method and an apparatus which can prevent a rosette moire from appearing in the color image. The present invention also relates to halftone images produced thereby.

2. Description of the Prior Art

In a printing process for reproducing a color image having continuous changes of color tone, a plurality of color separation images are generated from an original color image. The color separation images are recorded on a photosensitive film or the like as halftone images which represent density distribution of the respective color separation images by means of the size of halftone dots.

The halftone images are formed while employing respective screen angles different from each other to prevent a moire from appearing in the reproduced color image. For example, screen angles of 0°, 75°, 15° and 45° are employed in the halftone images of yellow magenta, cyan and black printers, respectively.

There are some techniques well known in the art about setting respective screen angles for the halftone images. First, Japanese Patent Publication Gazette 52-49361 discloses a so-called rational-tangent method. The method is named so because a tangent of a screen angle is a rational number. Second, Japanese Patent Publication Gazette 55-6393 discloses a so-called irrational-tangent method in which a tangent of a screen angle is an irrational number.

According to the prior art, a rosette moire (or a rosette pattern) appears in a reproduced color image which is printed on the basis of three halftone images having respective screen angles 15°, 45°, and 75°, for example. The rosette moire is a pattern of circles located around a particular position where respective halftone dots of the three halftone images are overprinted. The rosette moire can be seen with the naked eye and is accepted to be deterioration of image quality because the rosette moire usually includes a great many circles. Therefore, a method of recording halftone images which can prevent the rosette moire has been an issue in this field.

SUMMARY OF THE INVENTION

The present invention is directed to a method of and apparatus for recording halftone images to be employed in reproducing a color image.

The method comprises the steps of: (a) preparing first to third image data representing first to third color separation images of the color image, respectively, (b) producing first to third halftone images as a function of the first to third image data, respectively, while setting first to third screen angles of the respective first to third halftone images so that each of differences between the first and third screen angles and between the second and third screen angles is about 30 degrees, placing respective ones of halftone dots of the first and second halftone images at a reference position on an image plane of a color image to be reproduced, and placing one of the halftone dots of the third halftone image distant from the reference position by a prescribed distance in one of a first direction representing the third screen angle and a second direction inclined at 90 degrees away from the first direction.

Preferably, the first to third halftone images are respectively formed of halftone dots whose positions are arrayed in the form of a square lattice.

The first to third halftone images may have respective pitches of halftone dots substantially equal to each other.

According to an aspect of the invention, the first to third screen angles are 15 degrees, 75 degrees and 45 degrees, respectively, and the prescribed distance is half a pitch of halftone dots of the third halftone image multiplied by an arbitrary odd number.

According to another aspect of the invention, tangents of the first and second screen angles are rational numbers approximate to values of tan 15° and tan 75°, respectively, the third screen angle is 45 degrees, and the prescribed distance is half a pitch of halftone dots of the third halftone image multiplied by an arbitrary odd number.

Preferably, the step (a) comprises the steps of: (a-1) scanning and reading a color original to obtain the first and second image data while arbitrarily placing a first reference point on an image plane of the color original, and (a-2) scanning and reading the color original again to obtain the third image data while placing a second reference point on the image plane of the color original so that main scanning coordinates of the first and second reference points agree with each other and subscanning coordinates of the first and second reference points agree substantially with each other, and the step (b) is executed while the first and second reference points are assumed to be identical.

The first to third halftone images may be images for magenta, cyan and black printers in arbitrary order.

The present invention is also directed to images produced according to the method or apparatus stated above.

Accordingly, an object of the present invention is to prevent the rosette moire from appearing in a reproduced color image.

These and other objects, features, aspects and advantages of the present invention will become more apparent from the following detailed description of the present invention when taken in conjunction with the accompanying drawings.

DESCRIPTION OF THE PREFERRED EMBODIMENTS

Some examples of the rosette moire and a basic idea for preventing the rosette moire will be described first.

Figure 1A:
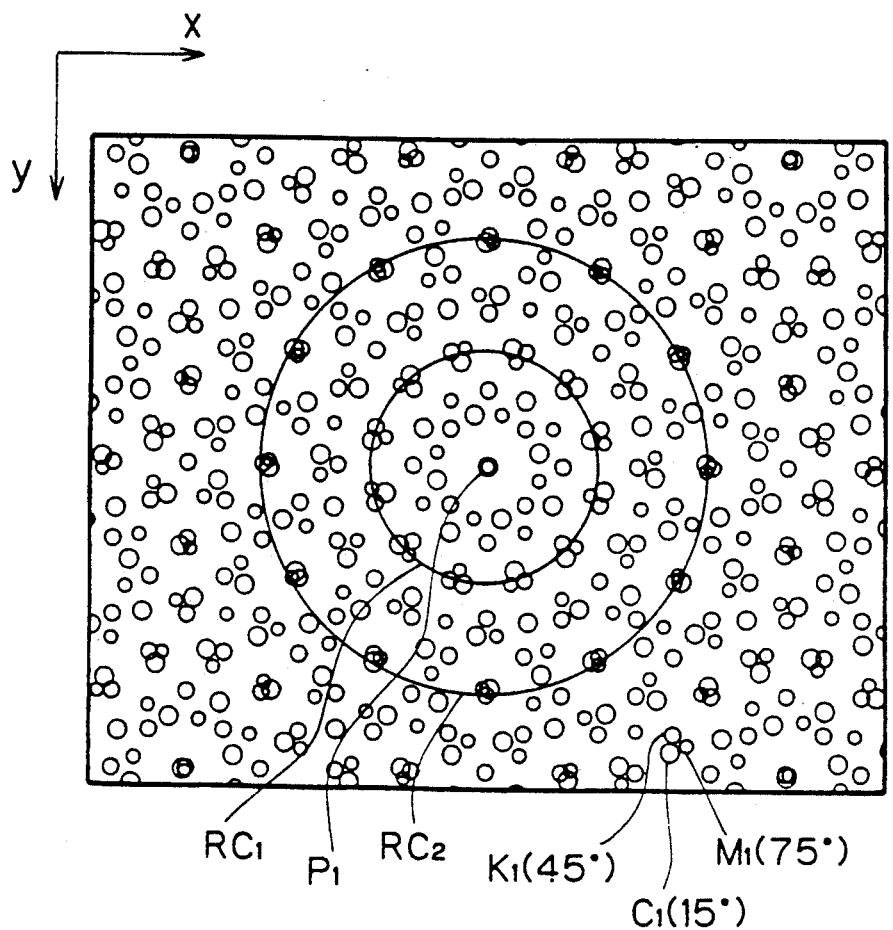
FIGS. 1A, 1B, 2A, 2B, 3A, 3B, 4A and 4B are diagrams showing arrangements of halftone dots having rosette moire.
Figure 1B:
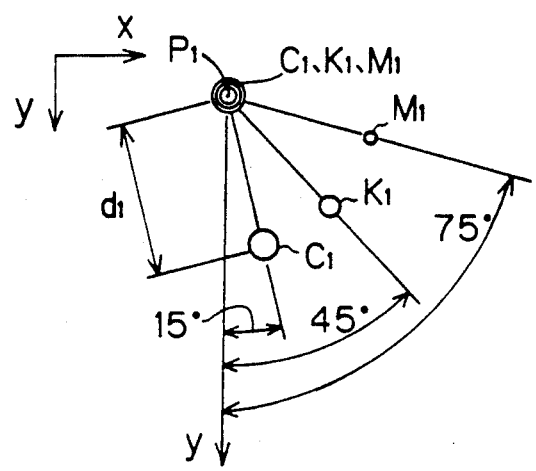

FIGS. 1A and 1B are diagrams showing an example of the rosette moire according to the irrational-tangent method. FIG. 1A illustrates positions of halftone dots $C_1$, $K_1$ and $M_1$ printed on a printing paper as halftone images of cyan, black and magenta printers, respectively, which are employed in the four color process as well as a yellow printer. The positions of halftone dots $C_1$, $K_1$ and $M_1$ are represented by large, middle-sized and small open circles, respectively. Because a halftone image of the yellow printer has relatively light density and is loosely related to the rosette moire, positions of yellow halftone dots are omitted in FIG. 1A. The halftone dots $C_1$, $K_1$ and $M_1$ of the cyan, black and magenta printers are arrayed with the screen angles of 15°, 45°, and 75°, respectively. At a central position $P_1$ in FIG. 1A, the three halftone dots $C_1$, $K_1$ and $M_1$ overlap each other.

FIG. 1B illustrates the configuration of the halftone dots $C_1$, $K_1$ and $M_1$ around the central position $P_1$. FIG. 1B also shows the screen angles of 15°, 45°, and 75° for those halftone dots. The screen angle is defined as an angle between a main scanning direction y and an axis of a lattice which is formed of halftone dots located at lattice points. The halftone images of the cyan, black and magenta printers have respective screen angles different from each other and a common screen pitch $d_1$ (or a distance between two adjacent halftone dots). The halftone dots in a halftone image are arrayed in the form of a square lattice.

When the three halftone dots $C_1$, $K_1$ and $M_1$ are printed at the same position $P_1$, particular circles $RC_1$ and $RC_2$ appear concentrically on which the three halftone dots $C_1$, $K_1$ and $M_1$ come together at periodic positions. Those circles $RC_1$ and $RC_2$ have diameters about four and eight times as long as the screen pitch $d_1$, respectively. Therefore, the circles $RC_1$ and $RC_2$ can be seen as noticeable circles, or as the rosette moire on printed matter with the naked eye. When such a pattern of circles appear at one position, similar patterns of circles appear in a wide area around the position and can be easily seen. Because those patterns of circles do not exist in an original image, they reduce the quality of the image.

Figure 2A:
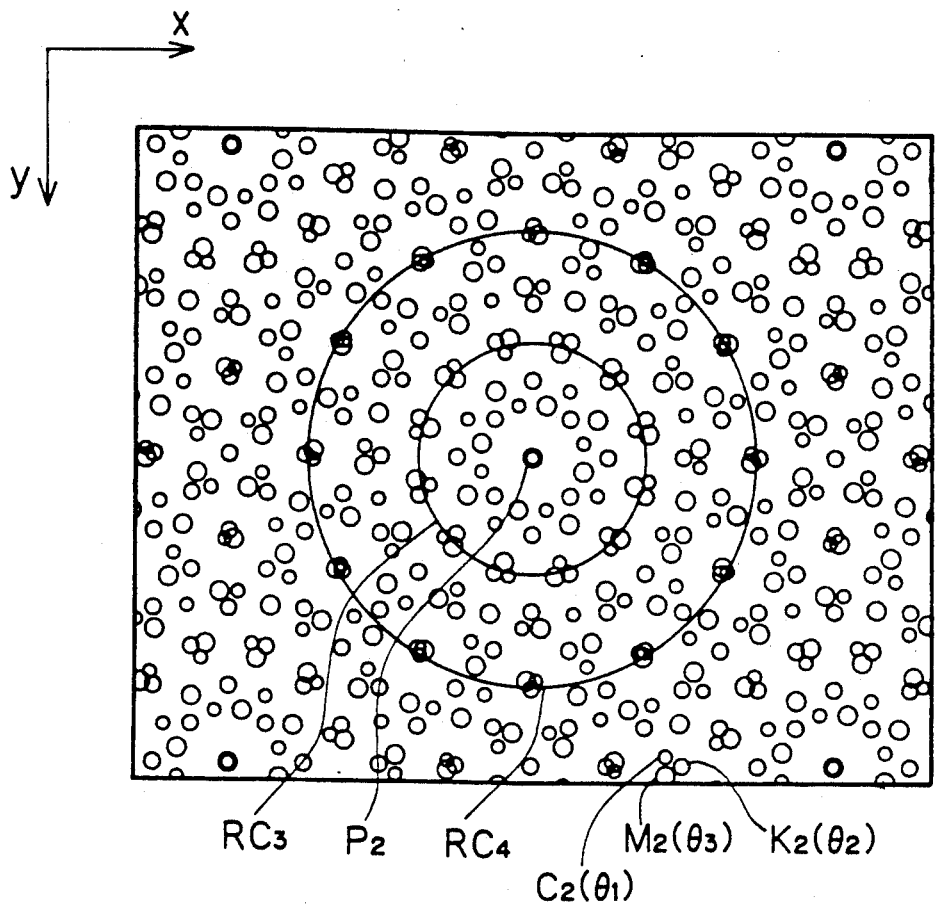
Figure 2B:
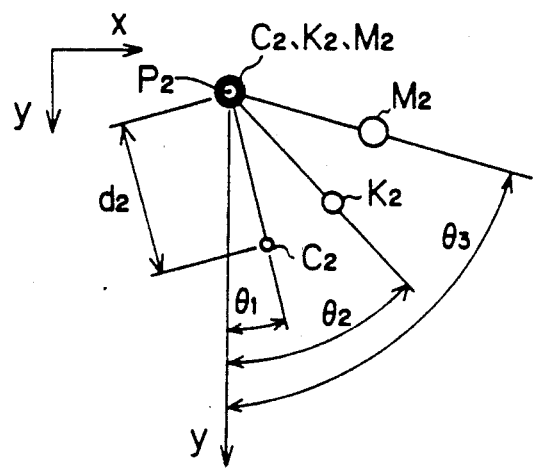

FIGS. 2A and 2B are diagrams showing another example of the rosette moire according to the rational-tangent method. Halftone dots $C_2$, $K_2$ and $M_2$ of the cyan, black and magenta printers are represented by small, middle-sized and large circles, respectively. According to the rational-tangent method, tangents of screen angles $\theta_1$, $\theta_2$ and $\theta_3$, which are employed in respective halftone images for the cyan, black and magenta printers, are rational numbers: 3/11, 1/1 and 11/3 for the screen angles $\theta_1$, $\theta_2$ and $\theta_3$, respectively, for example.

As is the case with FIG. 2A, when the three halftone dots $C_2$, $K_2$ and $M_2$ are located at a single position $P_2$, particular circles $RC_3$ and $RC_4$ appears concentrically on which the three halftone dots $C_2$, $K_2$ and $M_2$ come together at periodic positions. Namely, the rational-tangent method may cause the rosette moire similar to that by the irrational-tangent method.

As described above, the rosette moire appears when the three halftone dots of respective three halftone images are located at a same position $P_1$ or $P_2$.

Considering the above fact, the inventor first tried to prevent the rosette moire by shifting positions of the halftone dots relatively while keeping the screen angles as they are in FIGS. 1A or 1B.

Figure 3A:
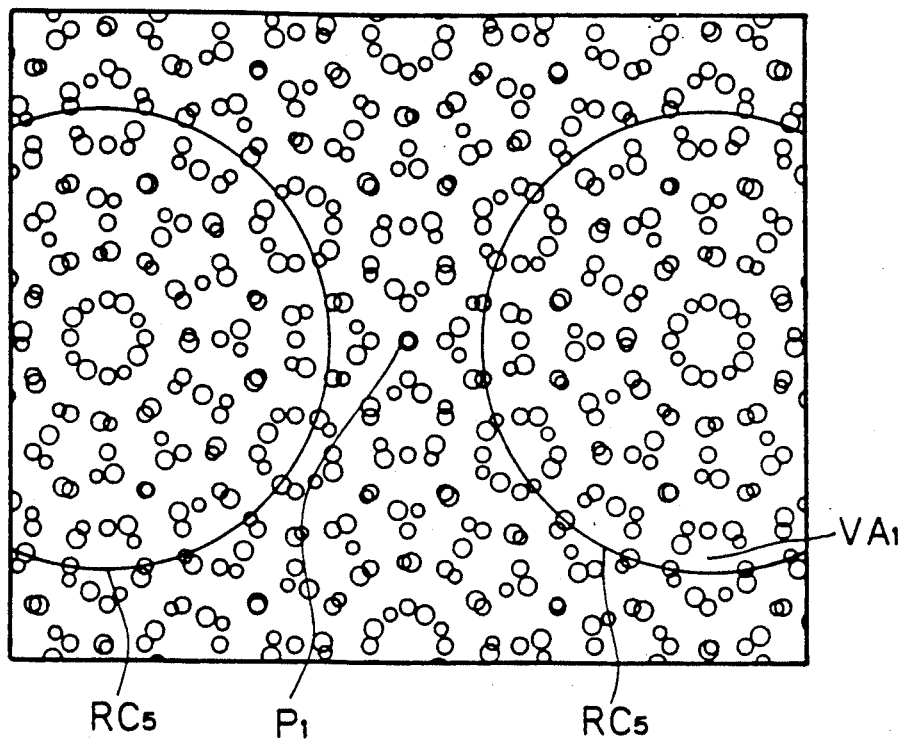
Figure 3B:
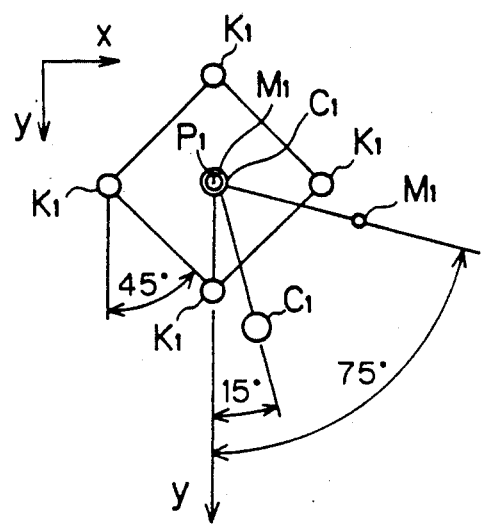

FIGS. 3A and 3B are diagrams showing the case in which the positions of the halftone dots $K_1$ of the black printer are shifted in a parallel manner from the state of FIGS. 1A and 1B. As can be seen in FIG. 3B, the halftone dots $C_1$ and $M_1$ of the cyan and magenta printers are printed at the position $P_1$ which is a face-center of the square lattice formed of the halftone dots $K_1$ of the black printers. FIG. 3A shows circles $RC_5$ on which vacant places $VA_1$ are located at periodic positions. Those circles $RC_5$ with the vacant places $VA_1$ are also seen as the rosette moire.

Figure 4A:
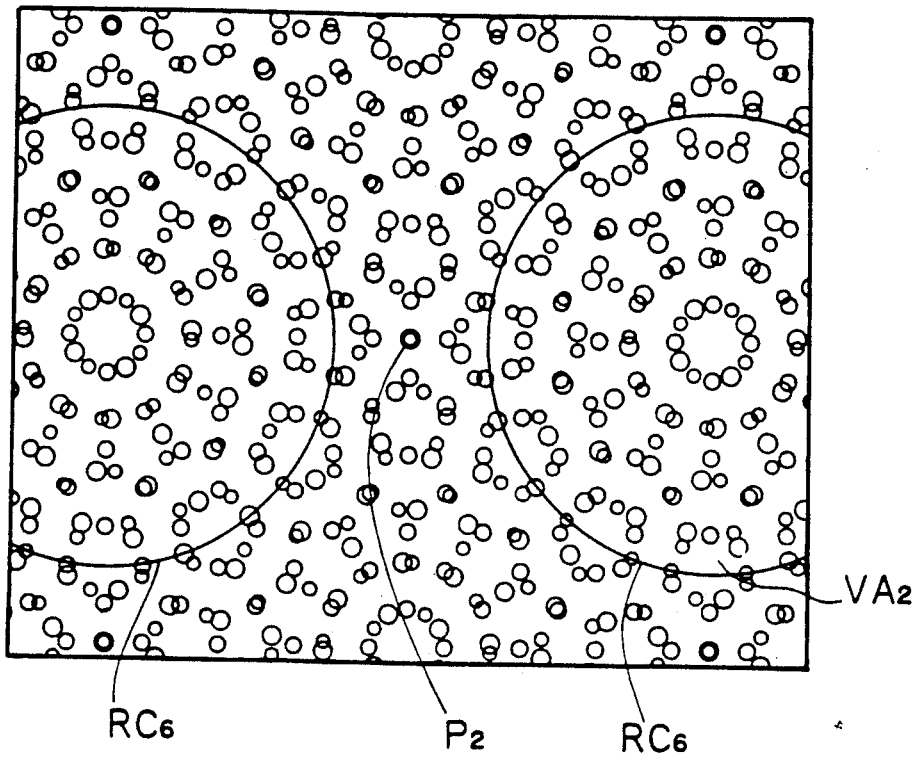
Figure 4B:
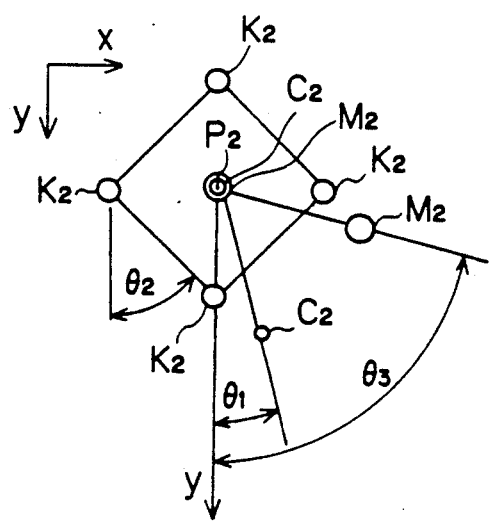

FIGS. 4A and 4B are diagrams corresponding to FIGS. 3A an 3B, according to the rational-tangent method. As is the case with FIGS. 3A, FIG. 4A shows circles $RC_6$ having vacant places $VA_2$ at periodic positions on them.

Figure 5A:
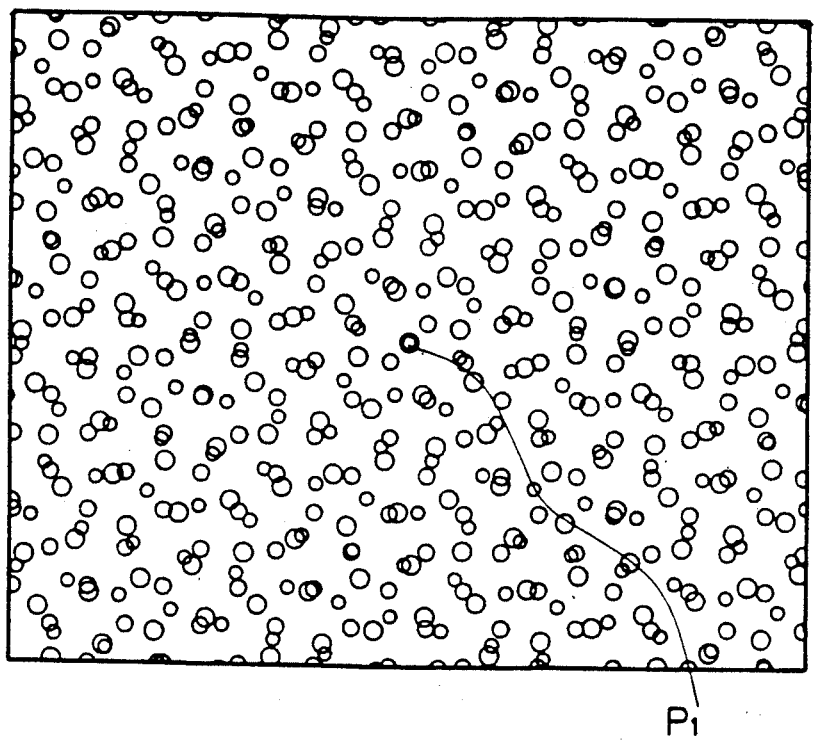
FIGS. 5A, 5B, 6A and 6B are diagrams showing arrangements of halftone dots according to a preferred embodiment of the present invention.
Figure 5B:
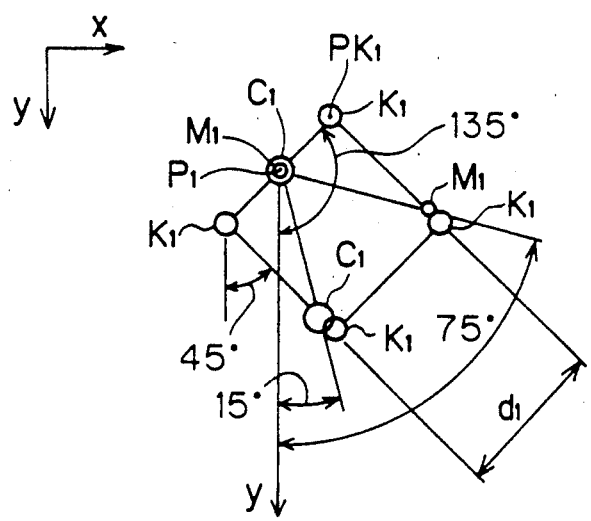
Figure 6A:
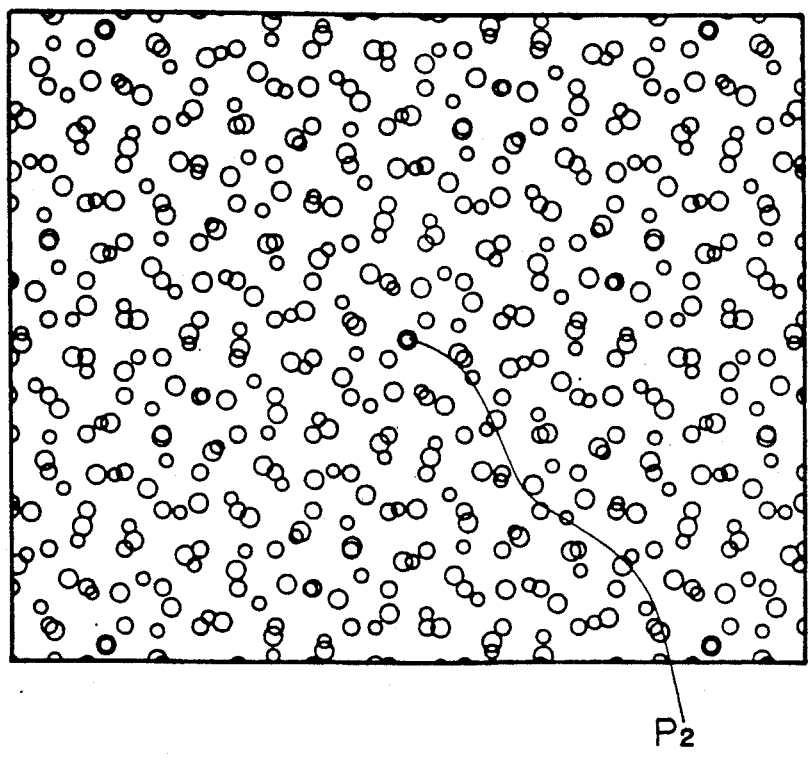
Figure 6B:
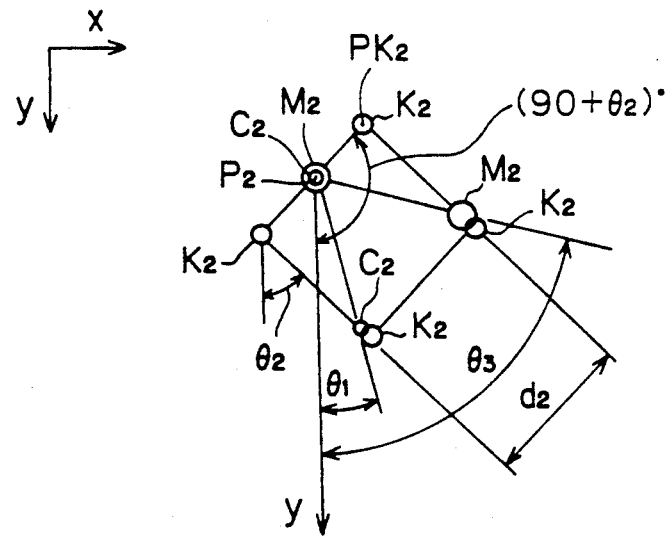

FIGS. 5A, 5B, 6A and 6B are diagrams showing the configuration of halftone dots according to a preferred embodiment of the present invention. FIGS. 5A and 5B are diagrams according to the irrational-tangent method, and FIGS. 6A and 6B are diagrams according to the rational-tangent method. Neither of FIGS. 5A and 6A show any rosette moire. As can be seen in FIG. 5B, the positions of the halftone dots $C_1$ and $M_1$ are the same as those in FIGS. 1B and 3B. On the other hand, the positions of the halftone dots $K_1$ of the black printer are shifted relatively in a parallel manner; the halftone dots $C_1$ and $M_1$ of the cyan and magenta printers are printed on the point $P_1$ which is a central position between two lattice points of the square lattice formed of the halftone dots $K_1$. Now, the point $P_1$ is defined as a reference position of the halftone dots $C_1$ and $M_1$, and a position $PK_1$, which is the nearest position of the halftone dot $K_1$ to the reference position $P_1$, is defined as a reference position of the halftone dot $K_1$. The reference position $PK_1$ of the halftone dot $K_1$ is shifted from the reference position $P_1$ of the halftone dots $C_1$ and $M_1$ by a distance of half a screen pitch (or halftone dot pitch) $d_1$ in a particular direction inclined at 135 degrees away from the main scanning direction y. The particular direction corresponds to the direction which defines the screen angle of 45° of the black printer. Incidentally, the screen angles of 15°, 45° and 75° are the same as those of FIGS. 1B and 3B.

The arrangement of FIG. 6B according to the rational-tangent method is similar to that of FIG. 5B. A reference position $PK_2$ of the halftone dot $K_2$ is shifted from a reference position $P_2$ of the halftone dots $C_2$ and $M_2$ by a distance of half a screen pitch $d_2$ in a direction inclined at $(90+\theta_2)$ degrees away from the main scanning direction y.

As described above, the rosette moire can be prevented by arranging the reference halftone-dot positions of the cyan, magenta and black printers according to the above described relations (hereinafter referred to as "phasic relations"). Thereby printed matter which has smooth color tones and high image quality can be produced.

The reference halftone-dot positions may not be fixed specifically in respective halftone images. On the contrary, the reference halftone-dot position of the first and second halftone images can be defined as an arbitrary position at which two halftone dots of respective first and second halftone images are located at least closely. In this case, the reference halftone-dot position of the third halftone image is defined as a position of its halftone dot which is the nearest to the reference halftone-dot position of the first and second halftone images. By shifting the reference halftone-dot position of the third halftone image from that of the first and second halftone images by a distance of half a screen pitch in the particular direction, the rosette moire can be prevented.

Figure 7:
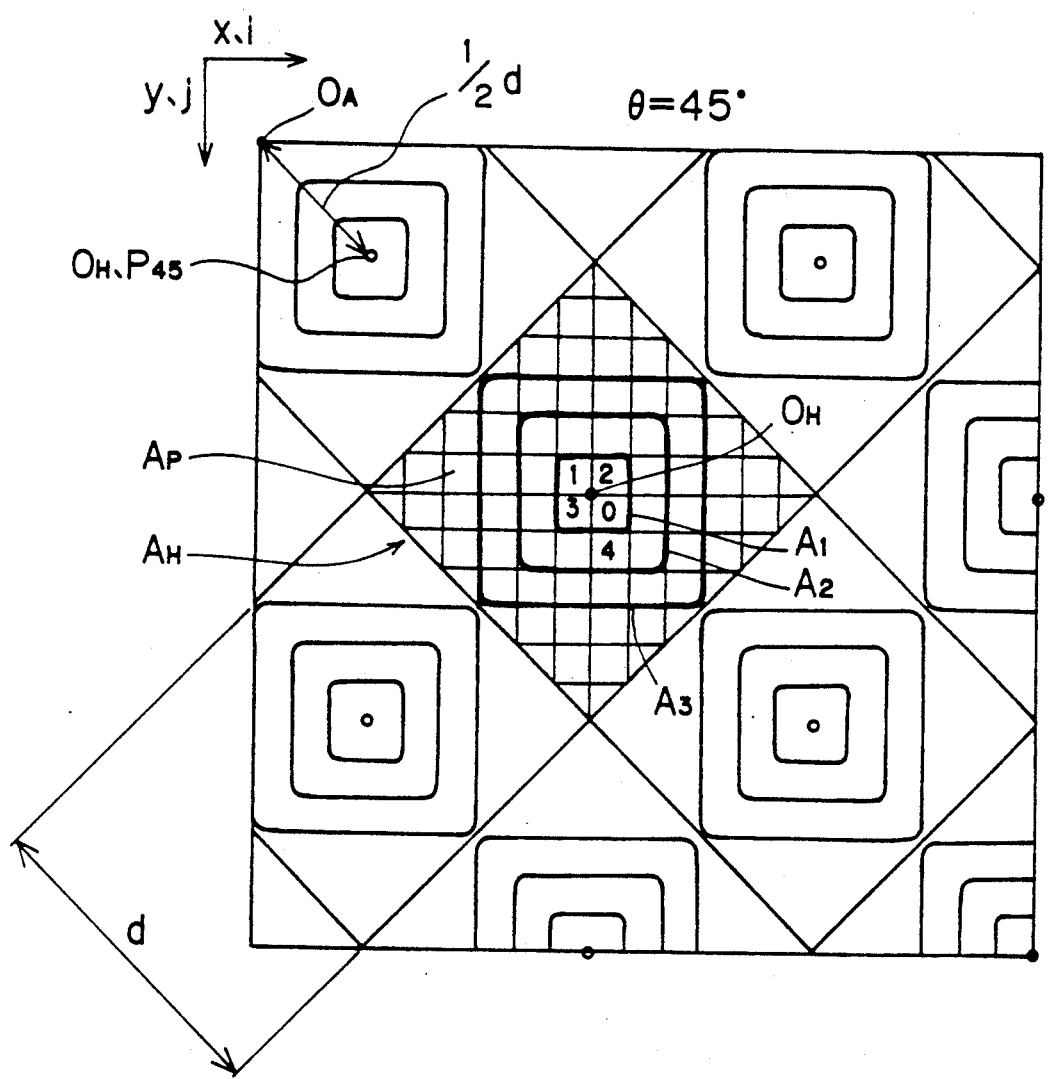
FIG. 7 is a schematic diagram showing screen pattern data.

FIG. 7 is a schematic diagram showing screen pattern data for a halftone image having a screen angle of 45°. The screen pattern data are used in producing the halftone images shown in FIGS. 5A and 6A. A halftone dot area $A_H$ has four sides each of which has a length equal to a screen pitch (or halftone dot pitch) d. The halftone dot area $A_H$ has the form of a square which includes a plurality of pixels $A_p$. In FIG. 7, the center $O_H$ of each halftone dot area $A_H$ is represented by an open circle.

The screen pattern data assigned to respective pixels $A_p$ are defined as threshold data with which it is judged whether respective pixels $A_p$ on a recording film are exposed or not. The values of the screen pattern data are so arranged to increase from the center $O_H$ to the periphery in the halftone dot area $A_H$. When density data are obtained by reading an original, the density data are compared with the screen pattern data with respect to each pixel. The pixel $A_p$ is exposed when the value of the density data at the pixel is larger than the screen pattern data. Therefore, the larger the value of the density data becomes, the more the exposed area expands as shown by outlines $A_1$, $A_2$ and $A_3$ in this order in FIG. 7. The exposed area forms a halftone dot.

In FIG. 7, pixels at the periphery of the halftone dot area AH are drawn to have the form of a triangle. Actually, there are no triangle pixels, and the boundaries of neighboring halftone dot areas are formed stepwise with square pixels $A_p$. Because the size of the pixel $A_p$ is very small, the boundaries approximate to straight lines.

FIG. 7 shows an origin $O_A$ of the screen pattern data. The halftone dot center $O_H$ which is the nearest to the origin $O_A$ is located at a position $P_{45}$ which is half a screen pitch d distant from the origin $O_A$. Assuming that the origin $O_A$ is located at the reference position $P_1$ of the halftone dots $C_1$ and $M_1$ shown in FIG. 5B, the position $P_{45}$ corresponds to the reference position $PK_1$ of the halftone dot $K_1$ in FIG. 5B. Although the position $P_{45}$ of FIG. 7 exists on a line through the origin $O_A$ which is inclined at 45° away from the main scanning direction y, the position $P_{45}$ is equivalent to the reference halftone-dot position $PK_1$ shown in FIG. 5B.

FIGS. 8A through 8D are schematic diagrams showing the distribution of respective screen pattern data employed in the four color process. The screen pattern data $D_y$, $D_c$, $D_k$ and $D_m$ for the yellow, cyan, black and magenta printers shown in FIGS. 8A through 8D have respective screen angles of 0°, 15°, 45° and 75°. The tangents of screen angles of 15° and 75° are irrational numbers. Each of screen pattern data $D_y$, $D_c$, $D_k$ and $D_m$ are digital data assigned to every pixel in a square area $R_D$ with four vertexes $O_A$, $O_B$, $O_C$ and $O_D$ which is applied for all of the four color printers on an image plane. FIG. 7 described before illustrates an enlarged part of FIG. 8C around the origin $O_A$. In FIGS. 8A through 8D, some halftone dot centers are shown as lattice points. Assuming that the halftone dot centers $P_0$, $P_{15}$, $P_{45}$ and $P_{75}$, each of which is the nearest to the origin $O_A$ in FIG. 8A, 8B, 8C and 8D, respectively, are the reference halftone-dot positions of respective halftone images, the reference halftone-dot positions $P_0$, $P_{15}$ and $P_{75}$ of the respective yellow, cyan and magenta printers are located at the origin $O_A$. On the other hand, the reference halftone-dot position $P_{45}$ of the black printer is shifted from the origin $O_A$ by a distance of half a screen pitch d in a direction declined at 45° away from the main scanning direction y. Therefore, the halftone images which have the phasic relations equivalent to those of FIG. 5A can be recorded by using the screen pattern data $D_y$, $D_c$, $D_k$ and $D_m$ shown in FIGS. 8A through 8D.

Figure 8A:
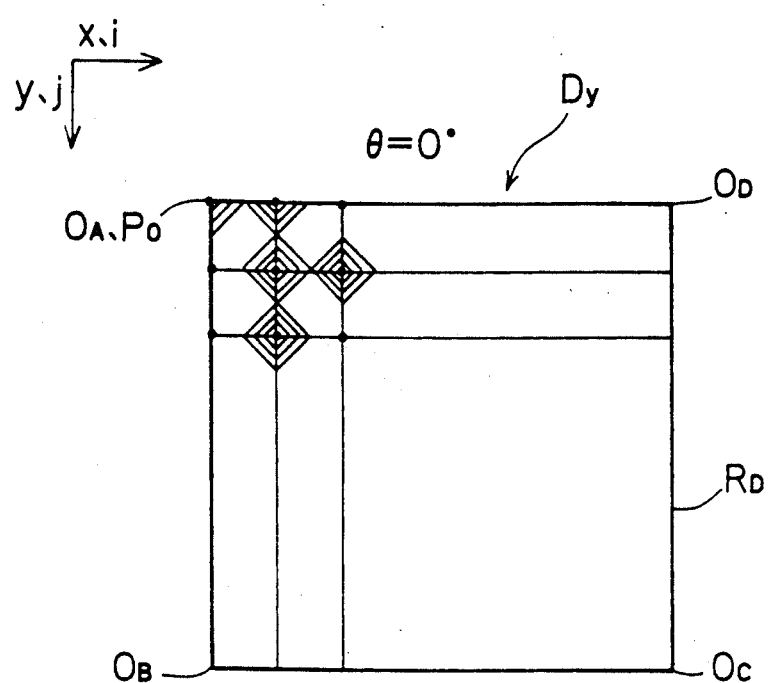
FIGS. 8A through 8D are schematic diagrams showing the distribution of respective screen pattern data employed in the four color process.

Since the halftone image of the yellow printer is loosely related to the rosette moire, the screen pattern data $D_y$ for the yellow printer can be changed from that of FIG. 8A.

The area $R_D$ in which the screen pattern data are assigned corresponds to only a part of the entire image plane. When a color scanner records a halftone image, the color scanner translates coordinates of a pixel in the main scanning direction y and the subscanning direction x into an address (i, j) in the area $R_D$, and reads out the screen pattern data stored in a memory according to the address. Thereby the halftone dots are formed periodically over the entire image plane.

Figure 9A:
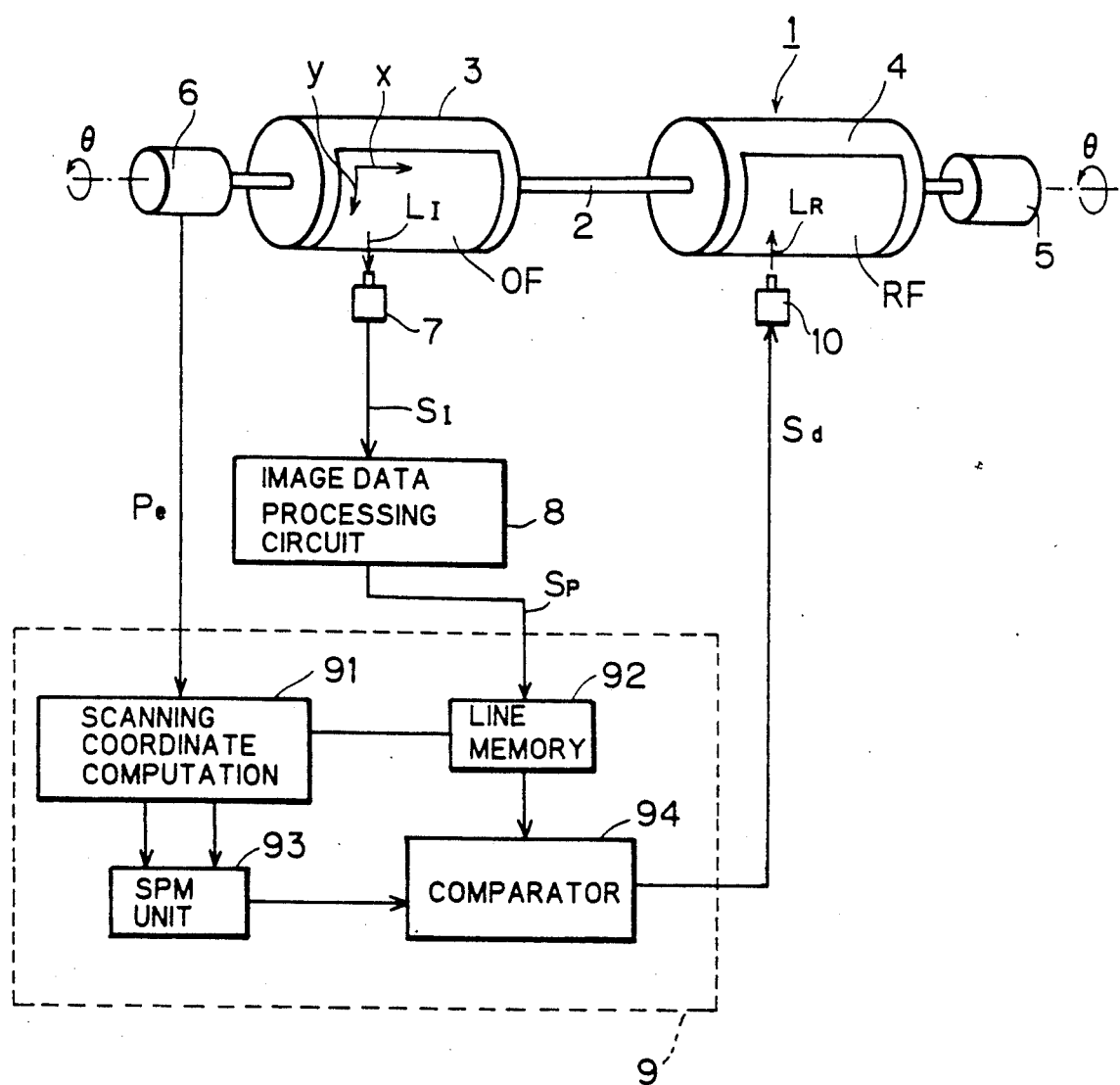
FIGS. 9A and 9B are block diagrams showing the structure of a color scanner according to a preferred embodiment of the present invention.

FIG. 9A is a block diagram showing the structure of a color scanner according to a preferred embodiment of the present invention. The color scanner 1 comprises a reading drum 3 and a recording drum 4 which are connected to each other by a common shaft 2. An original film OF is wound around the reading drum 3, and a photosensitive film RF is wound around the recording drum 4. The shaft 2 is provided with a motor 5 at one end and a rotary encoder 6 at the other end.

When the color scanner 1 reads the original OF and records images on the recording film RF, the motor 5 rotates the shaft 2, the reading drum 3 and the recording drum 4 in a direction $\theta$ at a constant speed. A light source (not shown) such as halogen lamp provided inside the reading drum 3 emits light $L_I$, and the light $L_I$ passing through the transparent reading drum 3 and the original OF is read by a pick-up head 7.

The pick-up head 7 moves in a subscanning direction x at a relatively slow speed. Therefore, the original OF is read in a main scanning direction y with respect to each scanning line in order. The main scanning direction y corresponds to the circumferential direction of the reading drum 3. The pick-up head 7 performs color separation operation to generate color separation signal $S_I$ having red (R), green (G) and blue (B) components. The color separation operation signal $S_I$ is supplied to an image data processing circuit 8. The image data processing circuit 8 performs the color correction and converts the color separation signal $S_I$ into density signals $S_p$ ($S_{py}$, $S_{pm}$, $S_{pc}$ and $S_{pk}$) for the yellow (Y), magenta (M), cyan (C) and black (B) printers, respectively. The density signals $S_p$ are supplied to a halftone signal conversion circuit 9 and converted therein into a dot signal $S_d$. The dot signal $S_d$ represents small dots (or halftone dots) to be recorded on the recording film RF. The dot signal $S_d$ is supplied to a recording head 10 which exposes the recording film RF with a laser beam $L_R$ according to the dot signal $S_d$ to record halftone images.

Figure 10:
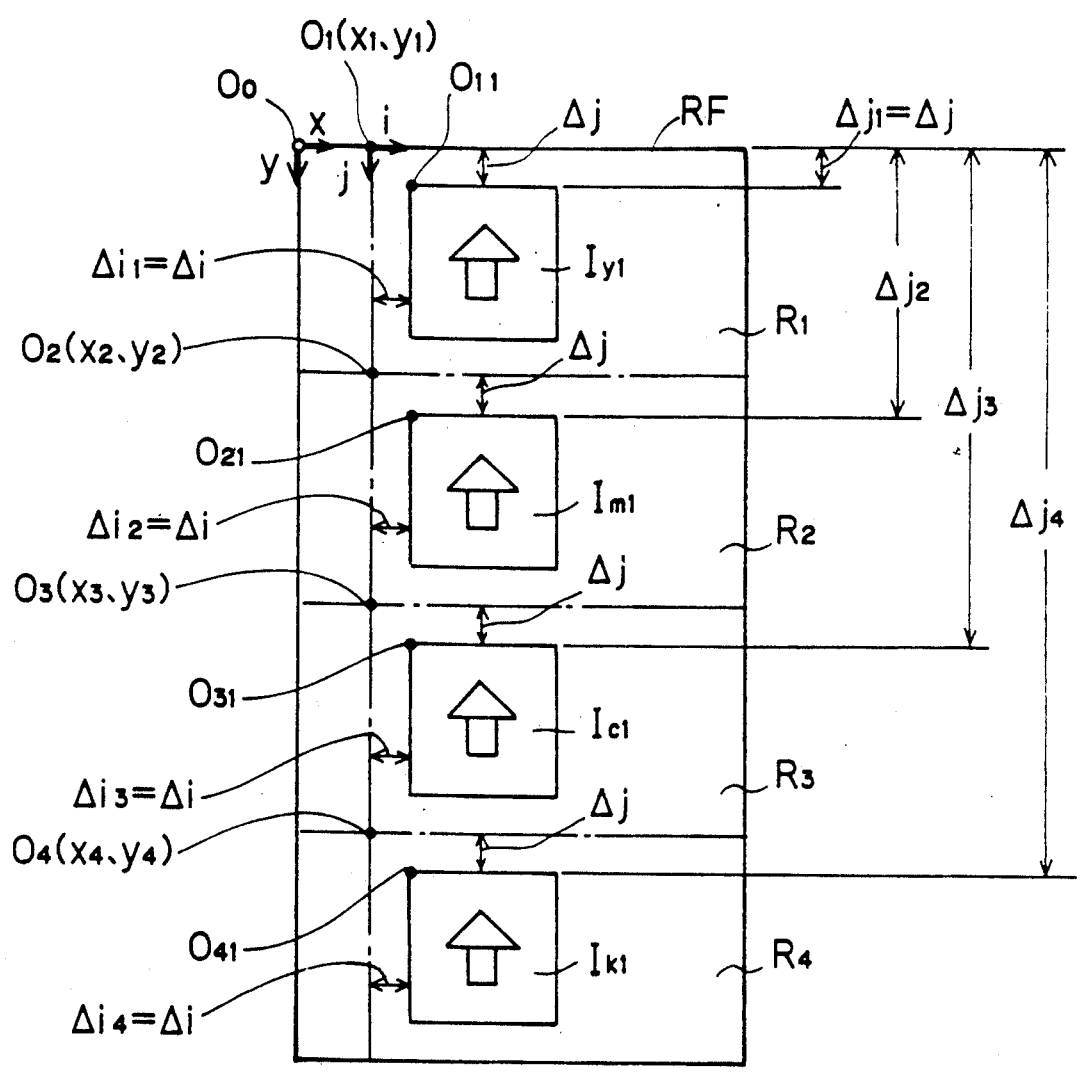
FIGS. 10, 11A and 11B are diagrams schematically showing half images recorded in a recording film.

FIG. 10 is a diagram schematically showing halftone images recorded on the recording film RF. Respective halftone images $I_{y1}$, $I_{m1}$, $I_{c1}$ and $I_{k1}$ for Y, M, C and K color components are respectively recorded on the single recording film RF. The arrangement of the halftone images can be aribitrarily changed.

The halftone signal conversion circuit 9 generates the dot signal $S_d$ with which the halftone images $I_{y1}$, $I_{m1}$, $I_{c1}$ and $I_{k1}$ are recorded on the single recording film RF. The halftone conversion circuit 9 comprises a scanning coordinate computation circuit 91, a line memory 92, a screen pattern data memory unit (or an SPM unit) 93 and a comparator 94.

Figure 9B:
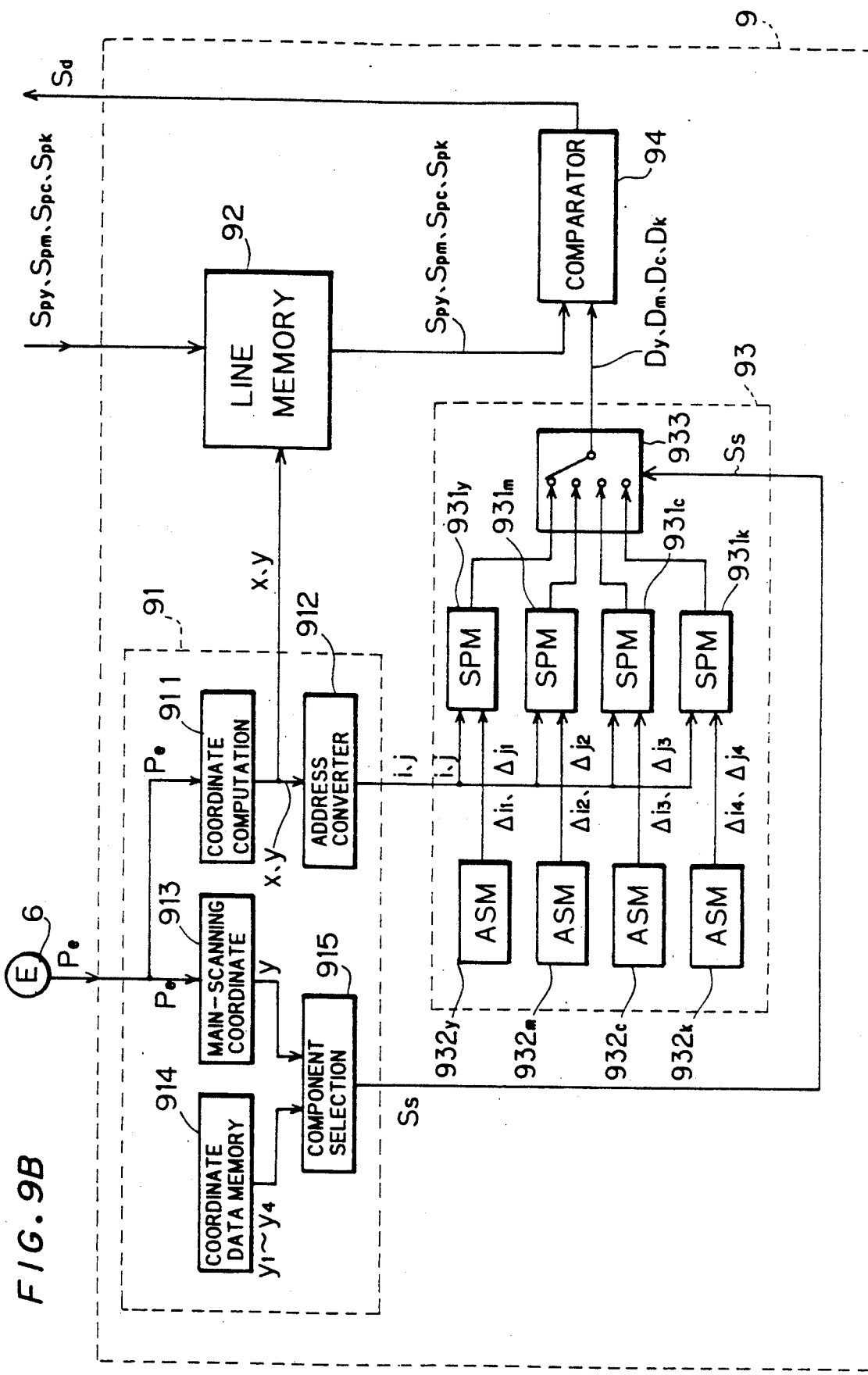

FIG. 9B is a block diagram showing the internal structure of the halftone signal conversion circuit 9.

The line memory 92 has capacity to store the values of the density signals $S_p$ ($S_{py}$, $S_{pm}$, $S_{pc}$ and $S_{pk}$) for one main scanning line with respect to each pixel in order of the scanning. The line memory 92 is divided into four memory portions corresponding to respective areas $R_1$ to $R_4$ shown in FIG. 10. The values of the Y, M, C and K components of the density signals $S_p$ are stored in the corresponding memory portions in the line memory 92.

The scanning coordinate computation circuit 91 computes scanning coordinates on the reading drum 3 and the recording drum 4 according to a pulse signal $P_e$ supplied from the rotary encoder 6. The pulse signal $P_e$ is generated by the rotary encoder 6 for every unit angle of rotation of the shaft 2. The pulse signal $P_e$ is supplied to a coordinate computation unit 911 and converted therein into a main scanning coordinate y and a subscanning coordinate x of the pick-up head 7 on the reading drum 3. During reading and recording operation, the reading and recording drums 3 and 4 rotate in the direction $\theta$ at a constant speed and the pick-up head 7 moves in the direction x at another constant speed. Therefore, both of the main scanning coordinate y and the subscanning coordinate x of the pick-up head 7 (or those of a reading position) are computed by counting up the number of pulses of the pulse signal $P_e$ while a prescribed reference position on the reading drum is assumed as an origin. In this embodiment, the recording head 10 moves in the direction at the same speed as the pick-up head 7. Therefore, the coordinates of recording position are the same as the coordinates (x, y) of the reading position.

The coordinate data (x, y) are supplied from the coordinate computation unit 911 to an address converter 912 and converted therein into an address (i, j) to be supplied to be the SPM unit 93.

The SPM unit 93 comprises four screen pattern memories (or SPM's) $931_y$, $931_m$, $931_c$ and $931_k$, four address shift memories (or ASM's) $932_y$, $932_m$, $932_c$ and $932_k$ and a data selector 933. The SPM's $931_y$, $931_m$, $931_c$ and $931_k$ store respective screen pattern data $D_y$, $D_m$, $D_c$ and $D_k$. The address shift memories $932_y$, $932_m$, $932_c$ and $932_k$ supply correction data $\Delta i_n$ and $\Delta j_n$, where n is an integer from 1 to 4, to the respective SPM's to adjust the address (i, j) supplied to the SPM's in accordance with the recording positions of respective halftone images $I_{y1}$, $I_{m1}$, $I_{c1}$ and $I_{k1}$. The data selector 933 selects one of the SPM's to connect the same with the comparator 94 in response to a selection signal $S_s$.

The selection signal $S_s$ indicates which one of the areas $R_1$ to $R_4$ of the recording film (see FIG. 10) the recording pixel exists in. The selection signal $S_s$ is computed in a component selection circuit 915 provided in the scanning coordinate computation circuit 91, on the basis of the main scanning coordinate y and coordinate data $y_1$ to $y_4$ for respective halftone images. The main scanning coordinate y is supplied from a main-scanning coordinate computation unit 913. The coordinate data $y_1$ to $y_4$ are supplied from a coordinate data memory 914.

The screen pattern data are read out from the SPM's and supplied to the comparator 94 as follows:

First, the screen pattern address (i, j) is computed by the address converter 912. A particular position $O_0$ on the recording film RF shown in FIG. 10 is an origin of the recording position on the recording drum 4. The coordinate computation unit 911 and the main-scanning coordinate computation unit 913 respectively compute the scanning coordinates (x, y) and the main scanning coordinate y while the position $O_0$ is assumed as an origin. When the four halftone images $I_{y1}$, $I_{m1}$, $I_{c1}$ and $I_{k1}$ are recorded on the single recording film RF, as in FIG. 10, the recording film RF are imaginarily divided into the four areas $R_1$ to $R_4$. The respective four areas $R_1$ to $R_4$ have reference area points $O_1$ to $O_4$ to be employed as an origin of address of the screen pattern data. The address converter 912 memorizes coordinate data $(x_1, y_1)$ of the reference area point $O_1$ of the first area $R_1$. The coordinate data $(x_1, y_1)$ are based on the origin $O_0$ as the origin of the coordinate plane. The address converter 912 computes the screen pattern address (i, j) on the basis of the coordinate data $(x_1, y_1)$ and the scanning coordinates (x, y) supplied from the coordinate computation unit 911. The screen pattern address (i, j) is based on the reference area point $O_1$ as the origin of the address.

Second, the screen pattern address (i, j) is corrected with the correction data $\Delta i_n$ and $\Delta j_n$. The address shift memories $932_y$, $932_m$, $932_c$ and $932_k$ memorize the correction data $(\Delta i_1, \Delta j_1) - (\Delta i_4, \Delta j_4)$ which represent differences of coordinates between the reference area point $O_1$ and origins $O_{11}$ to $O_{41}$ of respective halftone images $I_{c1}$, $I_{m1}$, $I_{k1}$ and $I_{y1}$. The correction data $(\Delta i_1, \Delta j_1) - (\Delta i_4, \Delta j_4)$ are supplied to the SPM's $931_y$, $931_m$, $931_c$ and $931_k$, respectively, to correct the screen address data (i, j). Corrected address data are so defined that the origins $O_{11}$ to $O_{41}$ of the halftone images correspond to the origin $O_A$ of the screen pattern data (see FIGS. 8A to 8D). Incidentally, the origins $O_{11}$ to $O_{41}$ can be located at the reference area points $O_1$ to $O_4$ of respective areas $R_1$ to $R_4$.

Third, the coordinate data memory 914 memorizes the coordinate data $y_1$ to $y_4$ in the main scanning direction about the reference area points $O_1$ to $O_4$. These coordinate data $y_1$ to $y_4$ are fixed in advance by an operator in consideration of recording condition. The component selection circuit 915 judges which one of the areas $R_1$, $R_2$, $R_3$ and $R_4$ the recording position on the recording drum 4 exists in. The judgement is made on the basis of the coordinate data $y_1$ to $y_4$ and the main scanning coordinate y computed by the coordinate computation unit 911. The component selection circuit 915 generates the selection signal $S_s$ and supplies the same to the data selector 933. The data selector 933 selects one of the SPM's $931_y$, $931_m$, $931_c$ and $931_k$ in response to the selection signal $S_s$.

Finally, one of the screen pattern data $D_y$, $D_m$, $D_c$ and $D_k$ is supplied to the comparator 94 through the data selector 933 in accordance with the coordinates of the recording position. The comparator 94 also receives one of the density signals $S_p$ ($S_{py}$, $S_{pm}$, $S_{pc}$ and $S_{pk}$) from the line memory 92 in accordance with the coordinates (x, y) of the recording position. The comparator 94 generates the dot signal $S_d$ indicating whether each recording pixel (or a pixel at the recording position) is to be exposed or not, according to the comparison of the values of the density signal $S_p$ and the screen pattern data. The dot signal $S_d$ is supplied to the recording head 10, which exposes respective halftone images $I_{y1}$, $I_{m1}$, $I_{c1}$ and $I_{k1}$ on the recording film RF.

Printing plates for respective four color printers are produced with the recording film RF. Finally, a reproduced color image which has the phasic relations among respective halftone images as shown in FIG. 5A or 6A can be produced with those printing plates.

As described above, the halftone images $I_{y1}$, $I_{m1}$, $I_{c1}$, and $I_{k1}$ having the phasic relations as shown in FIG. 5A or 6A can be produced with a color scanner having the SPM's $931_y$, $931_m$, $931_c$ and $931_k$ which memorize the screen pattern data $D_y$, $D_m$, $D_c$ and $D_k$ formed as shown in FIGS. 8A through 8D.

In the above embodiment, the four halftone images are recorded on a single recording film. However, they can be recorded by twos on respective two recording films.

Figure 11A:
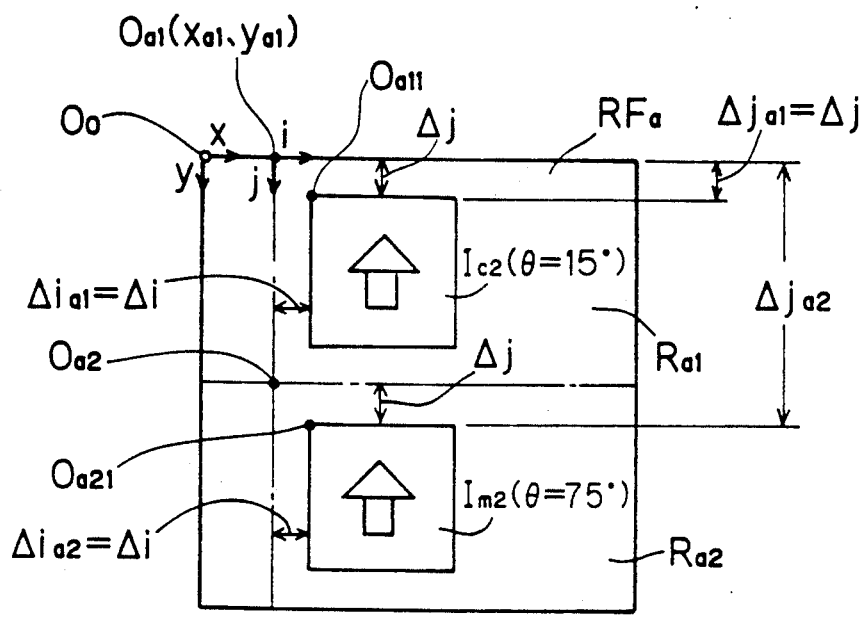
Figure 11B:
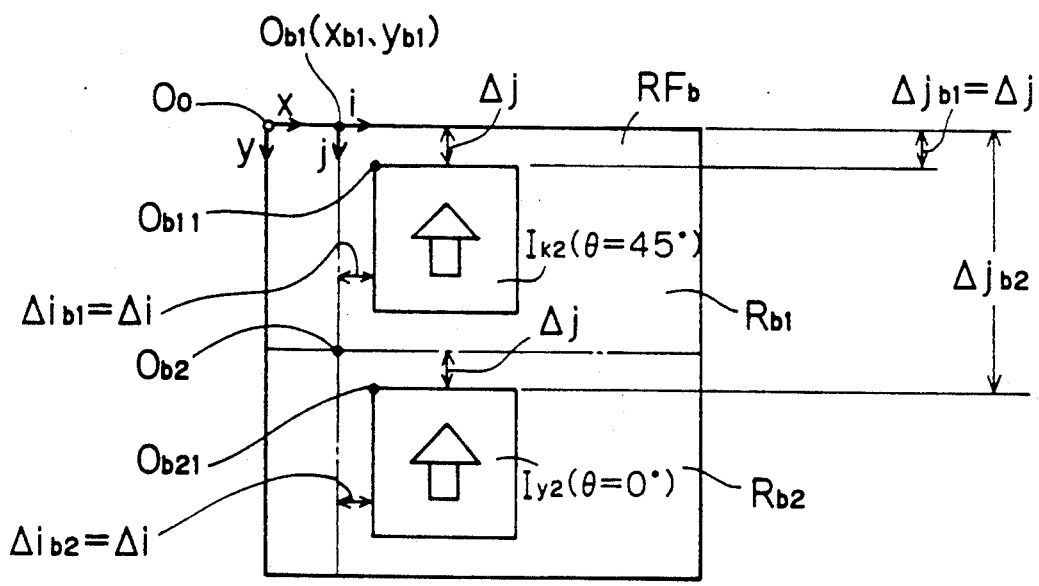

FIGS. 11A and 11B are diagrams schematically showing halftone images recorded by twos on respective two films. Such a kind of arrangement is employed when the size of an image to be reproduced is too big to array the four halftone images in series around the recording drum; more specifically, when the vertical length of one halftone image is longer than a quarter of the circumference of the recording drum 4. In general, the original OF is read every time when one of two recording films $RF_a$ and $RF_b$ are exposed. The two recording films $RF_a$ and $RF_b$ have respective reference area points $O_{a1}$ and $O_{b1}$ for the first areas $R_{a1}$ and $R_{b1}$. When the coordinates $(x_{a1}, y_{a1})$ and $(x_{b1}, y_{b1})$ of the reference area points $O_{a1}$ and $O_{b1}$ are settled to be equal, those reference area points $O_{a1}$ and $O_{b1}$ are located at the same position on the image plane of the original OF. Consequently, the halftone images identical to those shown in FIG. 10 can be produced on the recording films $RF_a$ and $RF_b$.

However, some types of color scanners can control the subscanning position of the pick-up head 7 less accurately than the main scanning position. By such color scanners, the subscanning coordinates $x_{a1}$ and $x_{b1}$ of the reference area points $O_{a1}$ and $O_{b1}$ may be different from each other in the image plane of the original.

Figure 12:
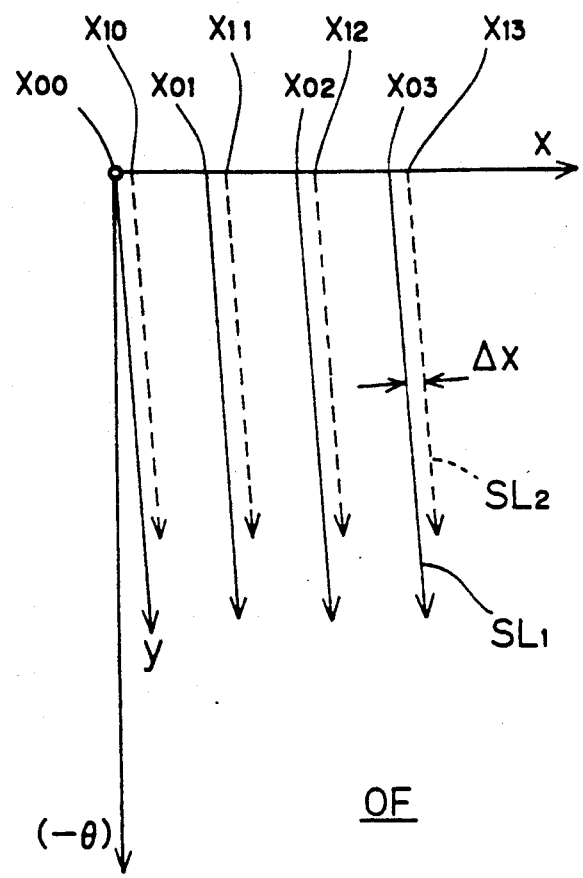
FIG. 12 is a schematic diagram showing scanning lines at twice of reading operation.

FIG. 12 is a schematic diagram showing scanning lines when the original is read twice. Because the original OF is read with the pick-up head 7 moving in the subscanning direction x while the reading drum 3 are rotating in the direction $\theta$ at a constant speed, the main scanning direction y is inclined against the direction $\theta$. Scanning lines $SL_1$ at the first reading operation are represented by solid lines and scanning lines $SL_2$ at the second reading operation are represented by broken lines. The first scanning lines $SL_1$ are located at the coordinates $x_{00}, x_{01}, \ldots$ in the subscanning direction. On the other hand, the second scanning lines $SL_2$ are located at the coordinates $x_{10}, x_{11}, \ldots$ which are displaced by a deviation $\Delta x$ from the coordinates $x_{00}, x_{01}, \ldots$ respectively. The deviation $\Delta x$ is generally small and may not cause so much trouble. However, by employing the following technique, the rosette moire due to the deviation $\Delta x$, if any, can be prevented.

First, two halftone images $I_{c2}$ and $I_{m2}$ for the cyan and magenta printers are recorded on the first recording film $RF_a$ as a result of the first operation of reading the original OF. Consequently, origins $O_{a11}$ and $O_{a21}$ of respective halftone images $I_{c2}$ and $I_{m2}$ are precisely located at the same position on the image plane of the original OF.

Second, the other halftone images $I_{k2}$ and $I_{y2}$ for the black end yellow printers are recorded on the second recording film $RF_b$ as a result of the second operation of reading the original OF. Respective main scanning coordinates $y_{a1}$ and $y_{b1}$ of the reference area points $O_{a1}$ and $O_{b1}$ of the recording films $RF_a$ and $RF_b$ are settled equal to each other. On the other hand, subscanning coordinates $x_{a1}$ and $x_{b1}$ of the reference area points $O_{a1}$ and $O_{b1}$ can be distant from each other by the deviation $\Delta x$. Therefore, an origin $O_{b11}$ of the halftone image $I_{k2}$ for the black printer (FIG. 11B) is distant from the origin $O_{a11}$ of the halftone image $I_{c2}$ for the cyan printer (FIG. 11A) by the deviation $\Delta x$ on the image plane of the original OF, while the main scanning positions of those origins $O_{a11}$ and $O_{b11}$ are equal to each other.

Figure 13:
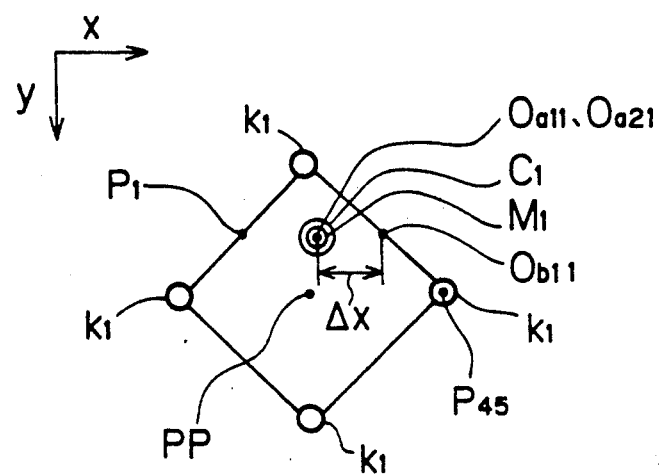
FIG. 13 is a schematic diagram showing the positional relations among origins of halftone images.

FIG. 13 is a schematic diagram showing the positional relations among the origins $O_{a11}$, $O_{a21}$ and $O_{b11}$ of halftone images on the image plane of the printed image, which is produced with the recording films $RF_a$ and $RF_b$. The origins $O_{a11}$ and $O_{a21}$ of the halftone dots $C_1$ and $M_1$ of the cyan and magenta printers are displaced from the origin $O_{b11}$ of the halftone dot $K_1$ of the black printer in the subscanning direction by the deviation $\Delta x$. This displacement (or mismatch) occurs because the halftone images $I_{y2}$, $I_{m2}$, $I_{c2}$ and $I_{k2}$ are registered in printing process so that their pictures conform to each other. The reason why the displacement occurs may be explained in another way as follows. The origins $O_{a11}$, $O_{a21}$ and $O_{b11}$ of the respective halftone images $I_{c2}$, $I_{m2}$ and $I_{k2}$ are assumed to be located at the same position on an image plane of an image to be reproduced. Therefore, the halftone images $I_{c2}$, $I_{m2}$ and $I_{k2}$ are recorded while assuming that those origins $O_{a11}$, $O_{a21}$ and $O_{b11}$ correspond to the origin $O_A$ of the screen pattern data shown in FIGS. 8A through 8D. However, when the halftone images $I_{y1}$, $I_{m2}$, $I_{c2}$ and $I_{k2}$ are registered in printing process so that their pictures conform to each other, the origins $O_{a11}$ and $O_{a21}$ are displaced from the origin $O_{b11}$ by the deviation $\Delta x$ due to the two reading operations while the origins $O_{a11}$ and $O_{a21}$ are positioned at the same plane.

The position $P_1$ of FIG. 13 corresponds to the reference halftone-dot position $P_1$ of FIG. 5B, and is equivalent to the origin $O_{b11}$ of the halftone image $I_{k2}$ for the black printer. Therefore, even if the amount of the deviation $\Delta x$ changes. The origins $O_{a11}$ and $O_{a21}$, or reference halftone-dot positions of the halftone images $I_{c2}$ and $I_{m2}$ are located on a line drawn through the origin $O_{b11}$ and the reference halftone-dot position $P_1$ in the subscanning direction. When the origins $O_{a11}$ and $O_{a21}$ as the reference positions of the halftone images $I_{c2}$ and $I_{m2}$ are on the line through the positions $O_{b11}$ and $P_1$, the rosette moire can be prevented in the same manner as the case in which those origins $O_{a11}$ and $O_{a21}$ are located at either of the positions $O_{b11}$ and $P_1$.

When the origins $O_{a11}$ and $O_{a21}$ of the halftone images $I_{c2}$ and $I_{m2}$ for the cyan and magenta printers are located at the reference halftone-dot position $PK_1$ of the halftone image $I_{k2}$ for the black printer, the rosette moire appears as shown in FIGS. 1A and 2A. When the origins $O_{a11}$ and $O_{a21}$ are located at the position PP in FIG. 13, the rosette moire appears as shown in FIGS. 3A and 4A. On the other hand, by recording the halftone images $I_{c2}$ and $I_{m2}$ for the cyan and magenta printers as a result of the same reading operation of reading the original and by making the main scanning coordinates of the reference points $O_{a1}$ and $O_{b1}$ of the two recording films $RF_a$ and $RF_b$ equal to each other, the respective halftone images can be prevented from having the phasic relations to cause the rosette moire.

Figure 8B:
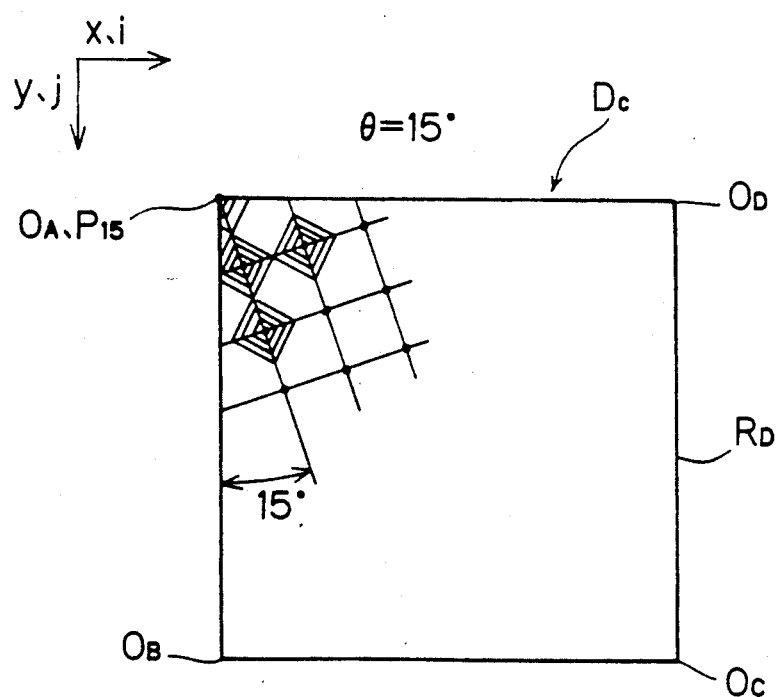
Figure 8C:
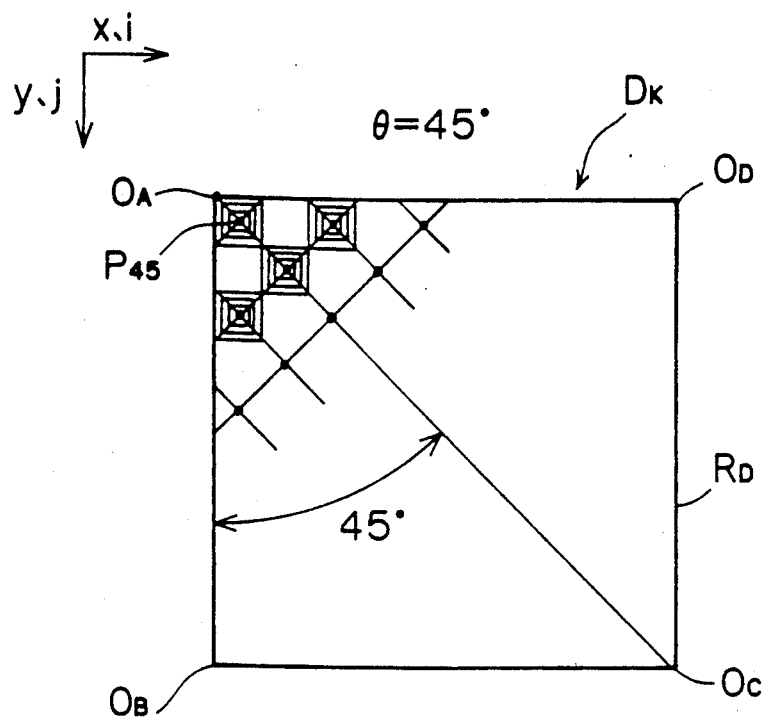
Figure 8D:
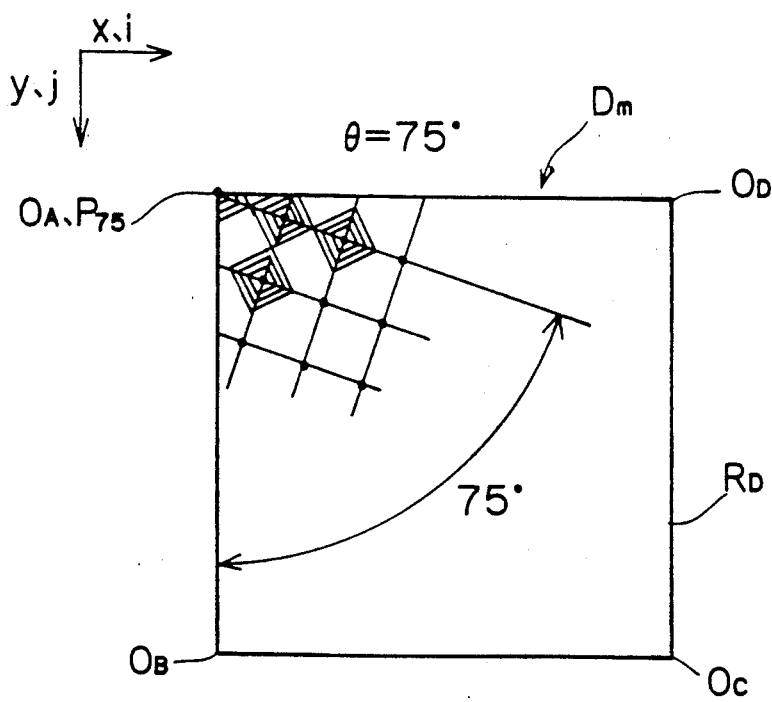

According to the methods described above, two halftone images $I_{c2}$ and $I_{m2}$ which have a common reference halftone-dot position are recorded as a result of the first operation of reading the original while employing the screen pattern date $D_c$ and $D_m$ shown in FIGS. 8B and 8D. On the other hand, the halftone image $I_{k2}$ which has a reference position of halftone dots different from those of the halftone images $I_{c2}$ and $I_{m2}$ is recorded as a result of the second operation of reading the original while employing the screen pattern dot $D_k$ shown in FIG. 8C. Those three halftone images $I_{c2}$, $I_{m2}$ and $I_{k2}$ are closely related to the rosette moire. By the above described method, the rosette moire can be prevented even if the deviation $\Delta x$ exists between the subscanning coordinates of the two recording films.

Incidentally, the order of the first and second operation of reading the original can be reversed.

The preferred embodiments above described can also be modified as follows.

The screen angles of the halftone images for the Yellow, magenta, cyan and black printers are set at 0°, 75°, 15° and 45°, respectively, in the preferred embodiments. However, the present invention can be applied for the case where the values of the screen angles are set otherwise. Assuming halftone images for the magenta, cyan and black printers as first, second and third halftone images in arbitrary order, first to third screen angles of respective first to third halftone images are set so that each of differences between the first and third screen angles and between the second and third screen angles is within a prescribed range around 30 degrees. The prescribed range is possibly 30°± a few degrees, and preferably 30°±1°. Tangents of the first to third screen angles may be either rational numbers or irrational numbers.

Because the halftone image of the yellow printer is loosely related to the rosette moire, the effects of the preferred embodiments can be attained by settling the phasic relations among the other halftone images (having the screen angles of 15°, 45° and 75°, for example) as described above except that of the yellow printer.

The present invention can be also applied to another type of printing process utilizing printing inks other than the primary color inks of yellow, magenta, cyan an black.

In the above embodiments, the reference halftone-dot position of the halftone image having the screen angle of 45° is shifted from the reference halftone-dot position of the other halftone images by a distance of half a halftone dot pitch d in a particular direction inclined 45° or 135° away from the main scanning direction where the particular direction represents the screen angle of 45° of the corresponding halftone image. The amount of the shift can be half a halftone dot pitch (or screen pitch) d multiplied by an odd number when the halftone dots of respective halftone images constitute square lattices.

According to another modification, a reference halftone-dot position of a particular halftone image having a screen angle other than 45° can be shifted from the reference halftone-dot position of the other halftone images in a direction which represents the screen angle of the particular halftone image. In this case, the amount of the shift may be set at half a screen pitch multiplied by an odd number.

The present invention can be also applied to a method of and apparatus for fabricating printing plates representing halftone images directly from halftone image data without recording the halftone images on a recording film.

The screen pattern data can be formed differently from that shown in FIGS. 8A through 8D. For example, the screen pattern data $D_k$ for the black printer may have its reference position $P_{45}$ at the position of the origin $O_4$. In this case, the shift values $\Delta i_4$ and $\Delta j_4$ stored in the address shift memory $932_k$ may be adjusted so that the reference position $P_{45}$ is located at the position which is distant from the origin $O_{41}$ of the area $R_4$ (see FIG. 10) by half a halftone dot pitch multiplied by an odd number in the direction representing the screen angle (45°) of the black printer.

According to the present invention, the rosette moire can be prevented because three halftone images which are closely related to the rosette moire avoid the phasic relations among each other which cause the rosette moire. Even when the original is read more than once to produce all of the halftone images, the phasic relations among the halftone images causing the rosette moire are avoided according to the present invention.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of recording halftone images to be employed in reproducing a color image, comprising the steps of
   (a) deriving from said color image first to third image data representing first to third color separation images of said color image, respectively,
   (b) producing first to third halftone images as a function of said first to third image data, respectively, while
      (i) setting first to third screen angles of said respective first to third halftone images so that each of the differences between said first and third screen angles and between said third and second screen angles is about 30 degrees,
      (ii) placing respective ones of the halftone dots of each of said first and second halftone images at a reference position on an image plane of a color image to be reproduced, and
      (iii) placing one halftone dot of said third halftone image a prescribed distance from said reference position in one of a first direction representing said third screen angle and a second direction inclined at 90 degrees away from said first direction.

2. A method in accordance with claim 1, wherein said first to third halftone images are respectively formed of halftone dots whose positions are arrayed in the form of a square lattice.

3. A method in accordance with claim 2, wherein the distance between adjacent halftone dots in each halftone image defines a pitch, and said first to third halftone images have respective pitches substantially equal to each other.

4. A method in accordance with claim 3, wherein said first to third screen angles are 15 degrees, 75 degrees and 45 degrees relative to a main scanning direction, respectively, and said prescribed distance is an odd multiple of one half the pitch between adjacent halftone dots of said third halftone image.

5. A method in accordance with claim 4, wherein said step (a) comprises the steps of:
(a-1) reading a color original to obtain said first and second image data while arbitrarily placing a first reference point on an image plane of said color original, and
(a-2) reading said color original again to obtain said third image data while placing a second reference point on said image plane of said color original so that main scanning coordinates of said first and second reference points are equal to each other and subscanning coordinates of said first and second reference points are substantially equal to each other, and
said step (b) is executed while said first and second reference points are assumed to be identical.

6. A method in accordance with claim 5, wherein said first to third halftone images are images for magenta, cyan and black printers in arbitrary order.

7. A method in accordance with claim 3, wherein tangents of said first and second screen angles are rational numbers approximate to values of tan 15° and tan 75° respectively,
said third screen angle is 45 degrees, and
said prescribed distance is an odd multiple of one half a pitch of adjacent halftone dots of said third halftone image.

8. A method in accordance with claim 7, wherein said step (a) comprises the steps of:
(a-1) reading a color original to obtain said first and second image data while arbitrarily placing a first reference point on an image plane of said color original, and
(a-2) reading said color original again to obtain said third image data while placing a second reference point on said image plane of said color original so that main scanning coordinates of said first and second reference points are equal to each other and subscanning coordinates of said first and second reference points are substantially equal to each other, and
said step (b) is executed while said first and second reference points are assumed to be identical.

9. A method in accordance with claim 8, wherein said first to third halftone images are images for magenta, cyan and black printers in arbitrary order.

10. An apparatus for recording halftone images to be employed in reproducing a color image, comprising:
(a) means for reading a color original to obtain first to third image data representing first to third color separation images of said color original, and
(b) means for producing first to third halftone images as a function of said first to third image data, respectively, while
(i) setting first to third screen angles of said respective first to third halftone images so that each of the differences between said first and third screen angles and between said third and second screen angles is about 30 degrees,
(ii) placing respective ones of the halftone dots of each of said first and second halftone images at a reference position on an image plane of a color image to be reproduced, and
(iii) placing one halftone dot of said third halftone image a prescribed distance from said reference position in one of a first direction representing said third screen angle and a second direction inclined at 90 degrees away from said first direction.

11. An apparatus in accordance with claim 10, wherein
said first to third halftone images are respectively formed of halftone dots whose positions are arrayed in the form of a square lattice having axes formed between said halftone dots so that angles formed between said axes and a scanning direction correspond to said screen angles.

12. An apparatus in accordance with claim 11, wherein
said first to third halftone images have respective pitches of adjacent halftone dots substantially equal to each other.

13. An apparatus in accordance with claim 12, wherein said first to third screen angles are 15 degrees, 75 degrees and 45 degrees relative to a main scanning direction, respectively, and
said prescribed distance is an odd multiple of one half a pitch of adjacent halftone dots of said third halftone image.

14. An apparatus in accordance with claim 12, wherein
tangents of said first and second screen angles are rational numbers approximate to values of tan 15° and tan 75° respectively,
said third screen angle is 45 degrees, and
said prescribed distance is an odd multiple of one half a pitch of adjacent halftone dots of said third halftone image.

15. Halftone images to be employed in reproducing a color image, comprising:
(a) a first halftone image of a first color having a first screen angle where one halftone dot is placed at a first position on an image plane of a color image to be reproduced,
(b) a second halftone image of a second color having a second screen angle where one halftone dot is placed at a second position which is the same as said first position on said image plane of a color image to be reproduced, and
(c) a third halftone image of a third color having a third screen angle where one halftone dot is placed at a third position which is separated from said first and second positions by a prescribed distance in one of a first direction representing said third screen angle and a second direction inclined at 90 degrees away from said first direction, said first to third screen angles being defined so that each of differences between said first and third screen angles and between said third and second screen angles is about 30 degrees.

16. Halftone images in accordance with claim 15, wherein
said first to third halftone images are respectively formed of halftone dots whose positions are arrayed in the form of a square lattice, and pitches of adjacent halftone dots of said first to third halftone images are substantially equal to each other.

17. Halftone images in accordance with claim 16, wherein said first to third screen angles are 15 degrees, 75 degrees and 45 degrees relative to a main scanning direction, respectively, and said prescribed distance is an odd multiple of one half a pitch of adjacent halftone dots of said third halftone image.

18. Halftone images in accordance with claim 16, wherein tangents of said first and second screen angles are rational numbers approximate to values of tan 15° and tan 75° respectively, said third screen angle is 45 degrees, and said prescribed distance is an odd multiple of one half a pitch of adjacent halftone dots of said third halftone image.

19. A printed color image reproduced by overprinting at least three halftone images, comprising:

(a) a first halftone image of a first color having a first screen angle where one of the halftone dots thereof is placed at a reference position on said printed color image, (b) a second halftone image of a second color having a second screen angle where one of the halftone dots thereof is placed at said reference position, and (c) a third halftone image of a third color having a third screen angle where one of the halftone dots thereof is placed at a position which is separated from said reference position by a prescribed distance in one of a first direction representing said third screen angle and a second direction inclined at 90 degrees away from said first direction, said first to third screen angles being defined so that each of the differences between said first and third screen angles and between said third and second screen angles is about 30 degrees.

20. A printed color image in accordance with claim 19, wherein said first to third halftone images are respectively formed of halftone dots whose positions are arrayed in the form of a square lattice, and pitches of adjacent halftone dots of said first to third halftone images are substantially equal to each other.

21. A printed color image in accordance with claim 20, wherein said first to third screen angles are 15 degrees, 75 degrees and 45 degrees relative to a main scanning direction, respectively, and said prescribed distance is an odd multiple of one half a pitch of adjacent halftone dots of said third halftone image.

22. A printed color image in accordance with claim 20, wherein tangents of said first and second screen angles are rational numbers approximate to values of tan 15° and tan 75° respectively, said third screen angle is 45 degrees, and said prescribed distance is an odd multiple of one half a pitch of adjacent halftone dots of said third halftone image.

* * * * *